AUTOMATIC BREAD TOASTER

Filed Oct. 12, 1939    8 Sheets-Sheet 1

Inventor:
Roy J. Anderson,
By: Arthur W. Nelson
Attorney.

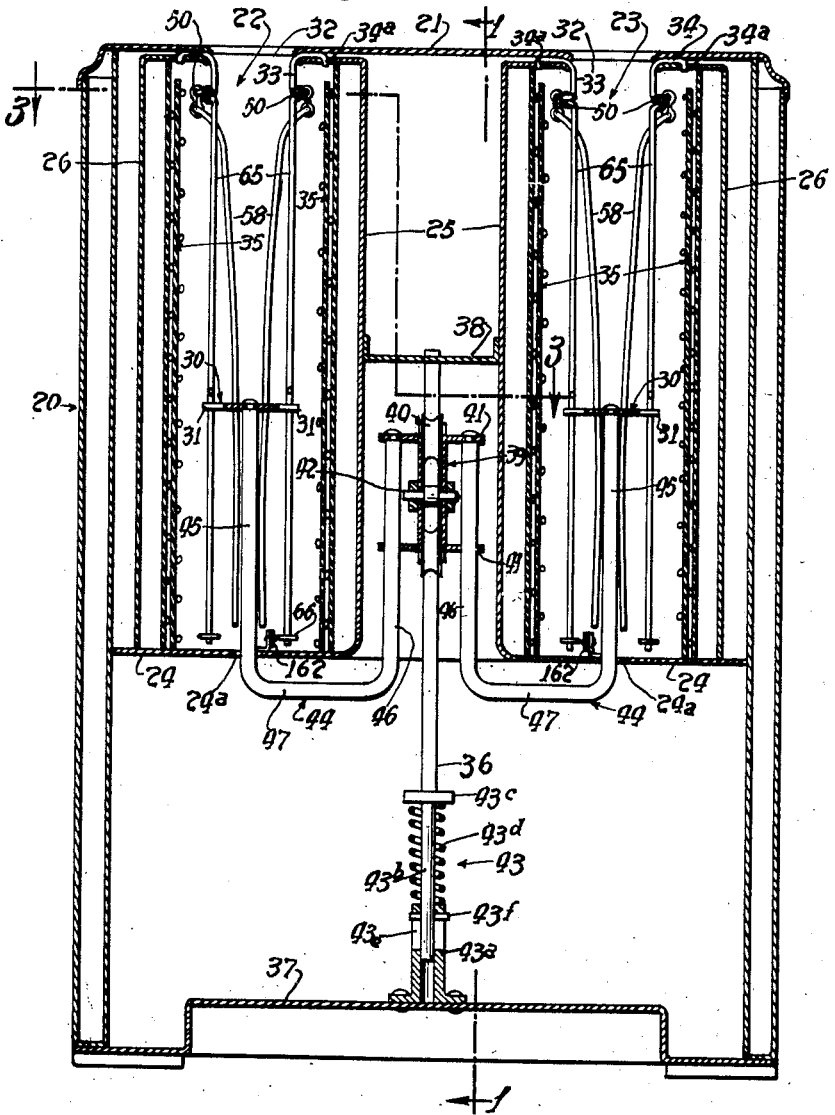

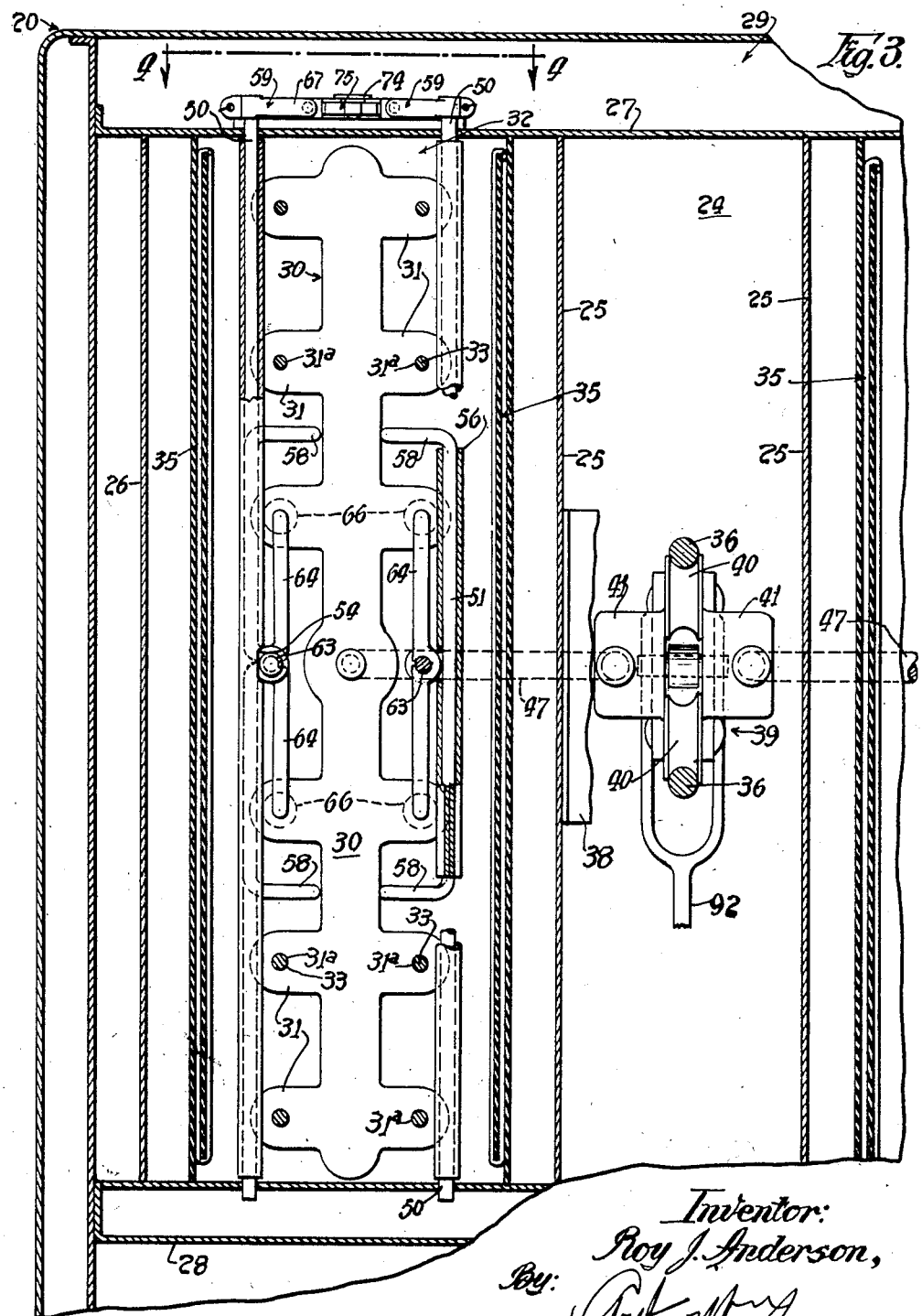

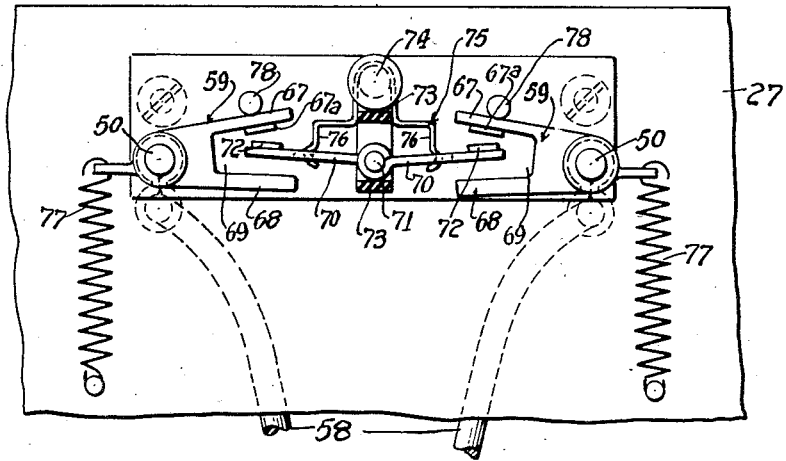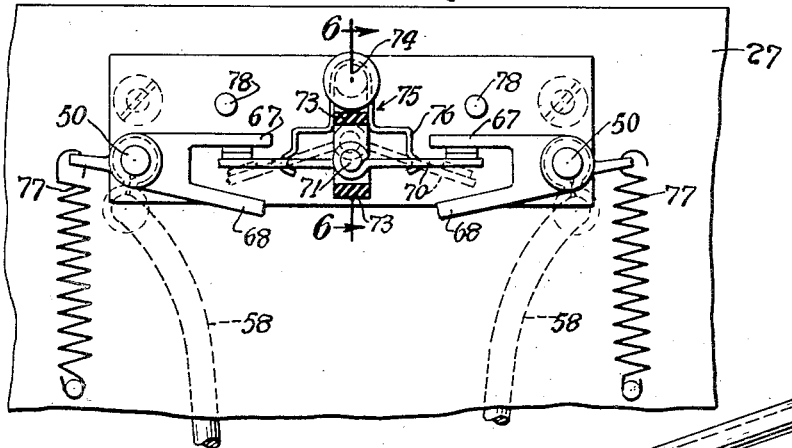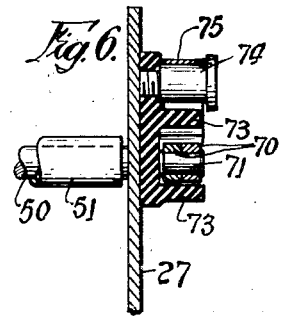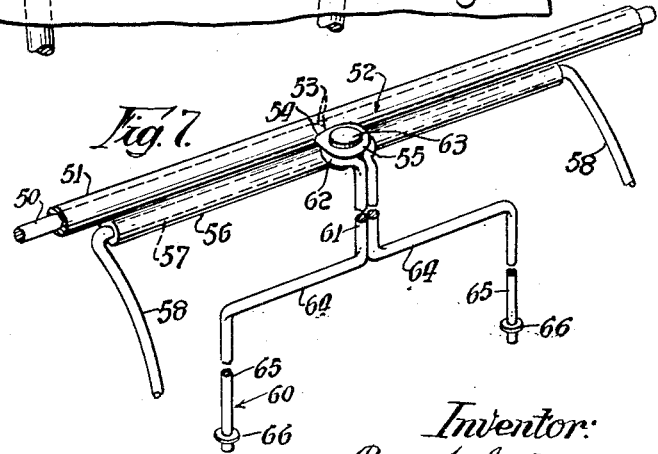

Jan. 5, 1943.　　　　R. J. ANDERSON　　　　2,307,347
AUTOMATIC BREAD TOASTER
Filed Oct. 12, 1939　　　　8 Sheets-Sheet 5
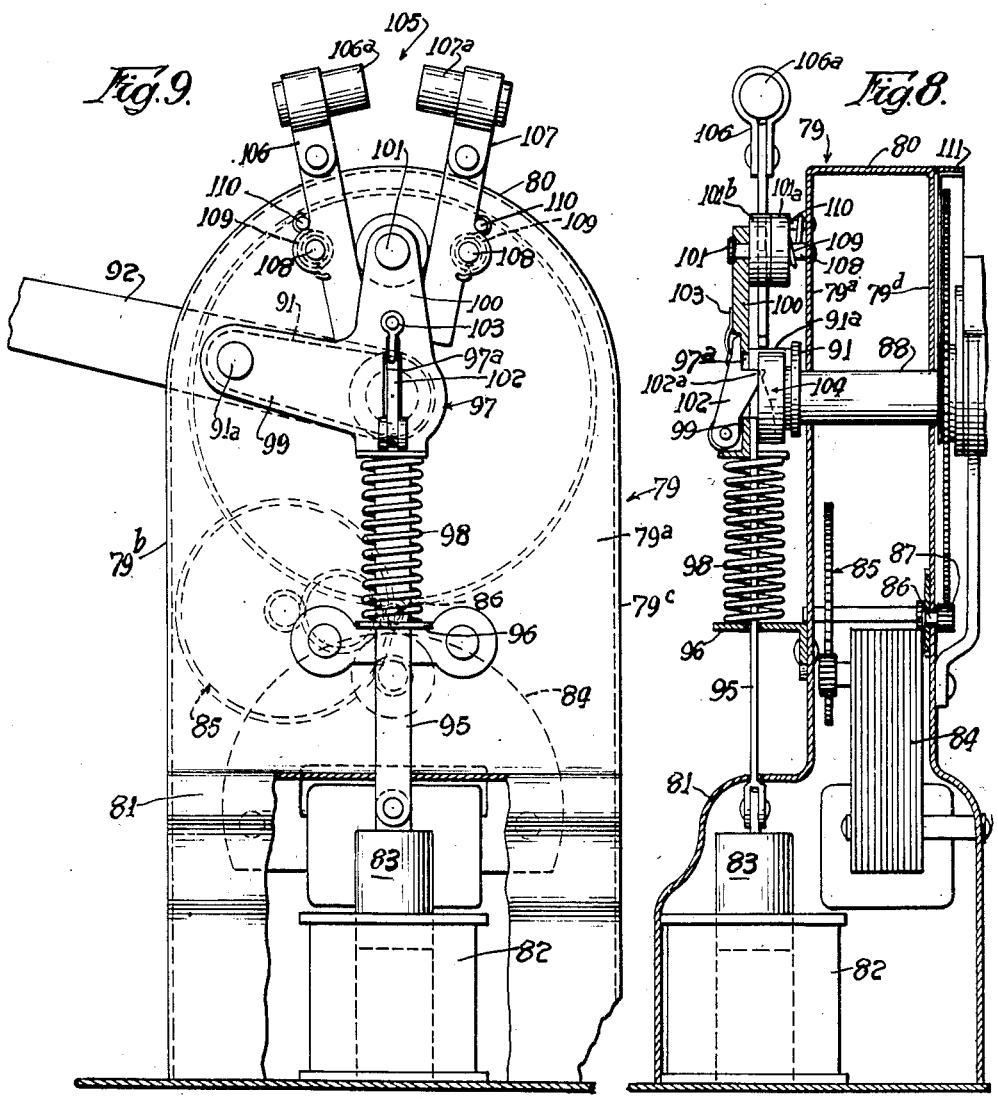
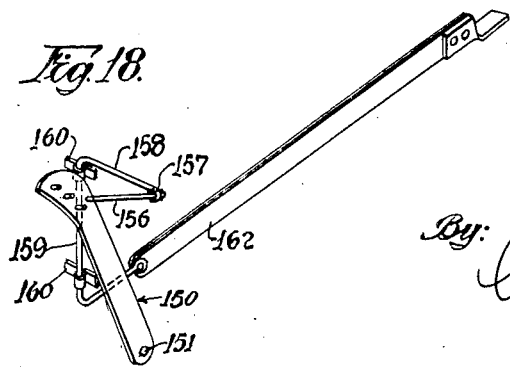
Inventor
Roy J. Anderson,
By: Arthur M. Nelson
Attorney.

Jan. 5, 1943.  R. J. ANDERSON  2,307,347
AUTOMATIC BREAD TOASTER
Filed Oct. 12, 1939  8 Sheets-Sheet 6
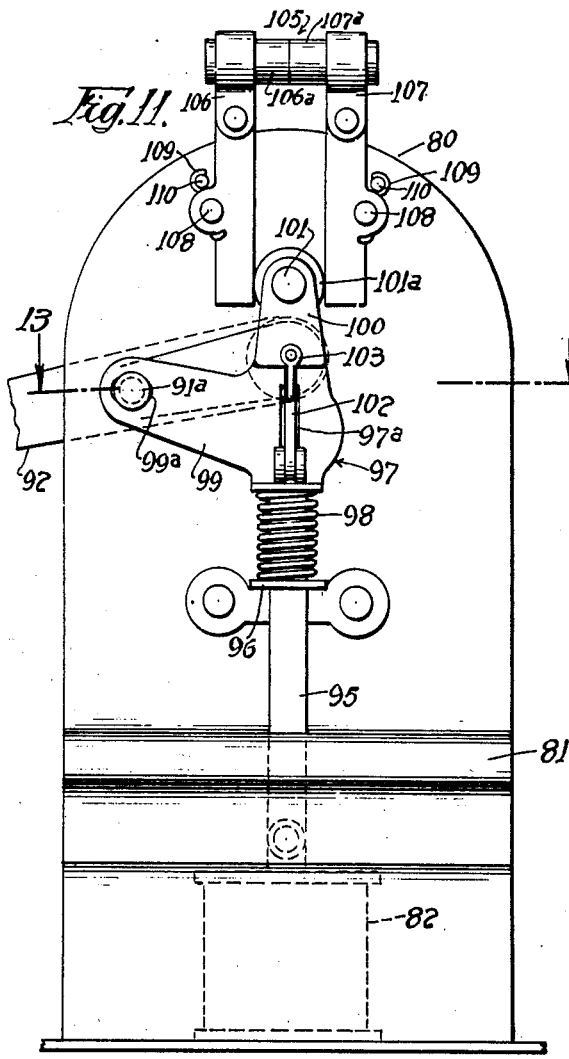
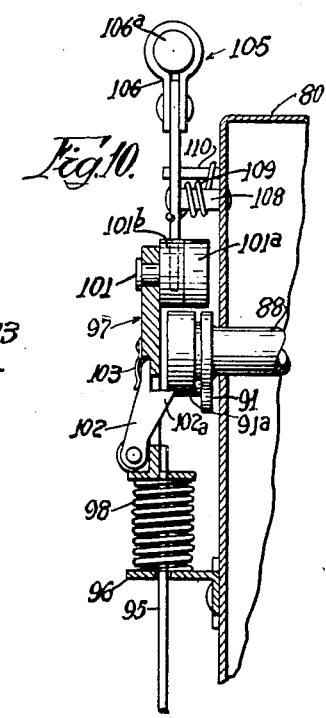
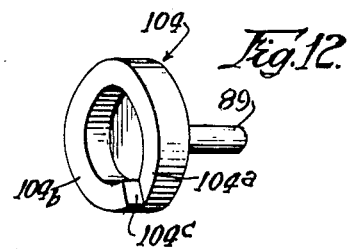
Inventor:
Roy J. Anderson,
By: Arthur M. Nelson
Attorney.

Inventor:
Roy J. Anderson,
By:
Attorney.

Jan. 5, 1943.　　　R. J. ANDERSON　　　2,307,347
AUTOMATIC BREAD TOASTER
Filed Oct. 12, 1939　　　8 Sheets-Sheet 3
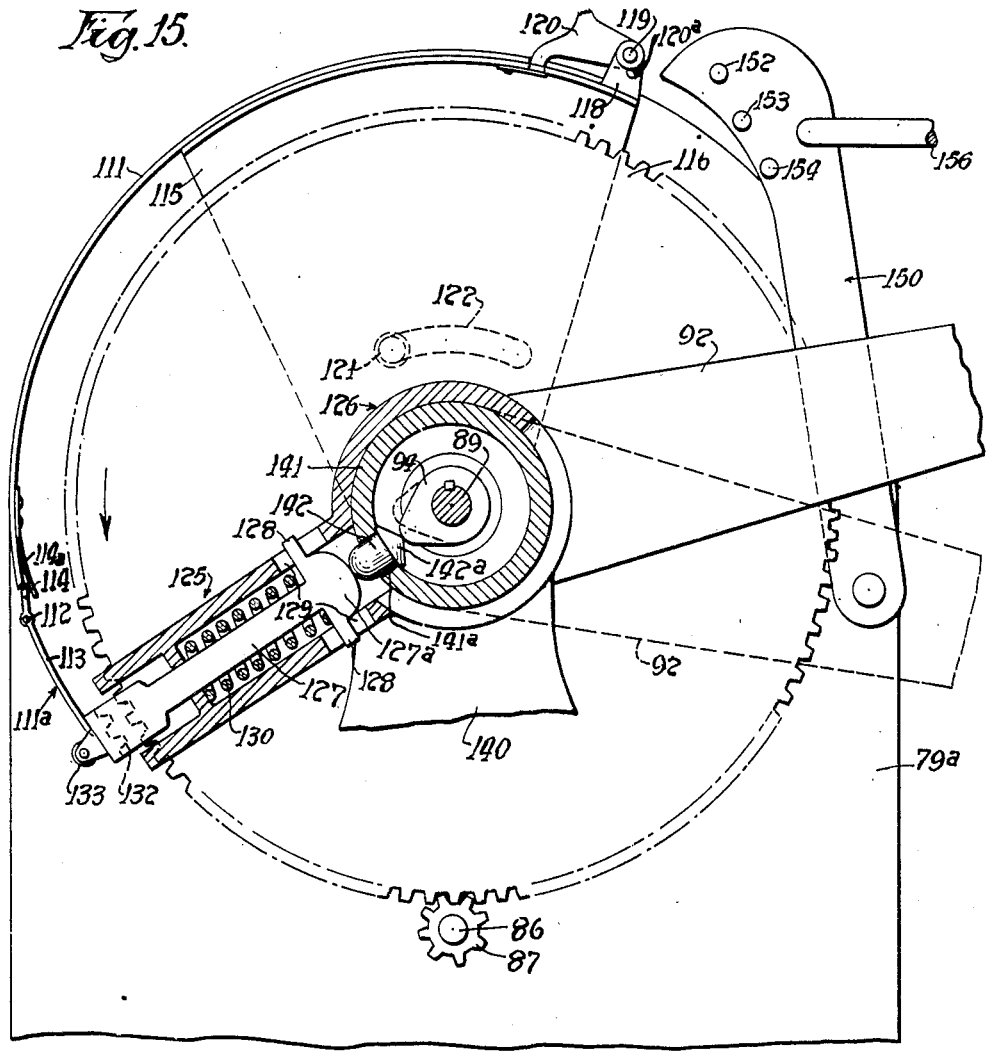
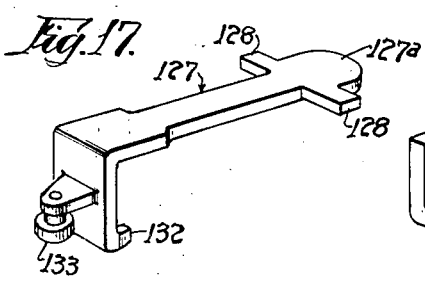
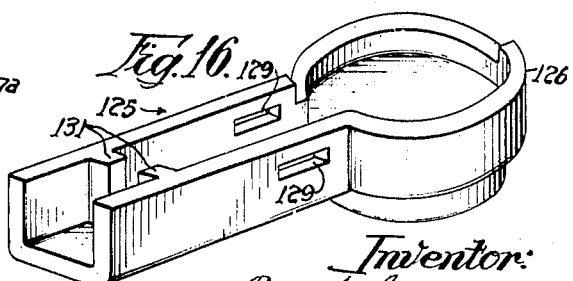
Inventor:
Roy J. Anderson,
By: Arthur W. Nelson
Attorney.

UNITED STATES PATENT OFFICE 2,307,347

AUTOMATIC BREAD TOASTER

Roy J. Anderson, Chicago, Ill., assignor, by direct and mesne assignments, to McGraw Electric Company, Elgin, Ill., a corporation of Delaware Application October 12, 1939, Serial No. 299,110

13 Claims. (Cl. 219—19)

This invention relates to improvements in automatic bread toasters and it consists of the matters hereinafter described and more particularly pointed out in the appended claims.

One of the objects of the present invention is to provide a bread toaster embodying mechanism of such construction that when a slice of bread is dropped into the toaster in the usual manner, it automatically initiates a toasting operation for the bread and at the end of said operation, the toasted bread is automatically disposed in a position for each withdrawal of the same from the toaster.

Another object of the invention is to provide a toaster of this kind which operates automatically to control the "on" periods of the source of heat so as to start a toasting operation when a slice of bread is dropped thereinto, and to change the length of the "on" periods of said source of heat, depending upon the temperature in the toasting chamber, as when starting with the apparatus in a cold condition or in a heated condition following a substantially previous toasting operation.

Again it is an object of the invention to provide an automatic bread toaster which is of simple construction for relatively low cost production but which is efficient in operation and requires no manipulation of any of the parts thereof but only the dropping of a piece of bread thereinto for initiating and finishing a toasting operation.

The above mentioned objects of the invention as well as others, together with the several advantages thereof will more fully appear as the specification proceeds.

In the drawings:

Fig. 2 is a transverse vertical sectional view through the toaster as taken on the line 2—2 of Fig. 1.

Fig. 3 is a horizontal sectional view through an upper portion of the toaster, on an enlarged scale, as taken on the line 3—3 of Fig. 2.

Fig. 4 is a detail vertical sectional view through a portion of the toaster on an enlarged scale as taken on the line 4—4 of Fig. 3 and illustrates more particularly a certain switch mechanism embodied in the toaster, with the parts in the "off" position they assume after a toasting operation.

Fig. 5 is a view of the parts appearing in Fig. 4 when in an "on" position as produced by dropping a slice of bread into the toaster.

Fig. 6 is a detail vertical sectional view through parts of Fig. 5 as taken on the line 6—6 of Fig. 5.

Fig. 7 is a perspective view of one of a plurality of switch actuating assemblies embodied in the toaster and which will be more fully referred to later.

Fig. 8 is a vertical sectional view, on a somewhat enlarged scale, through a part of the actuating mechanism of the toaster appearing in Fig. 1, as taken on the line 8—8 of said Fig. 1.

Fig. 9 is a view in side elevation of those parts of the mechanism at the left hand side of Fig. 8.

Fig. 10 is a fragmentary view similar to Fig. 8 and shows parts thereof in a changed relation.

Fig. 11 is a view similar to Fig. 9 with parts thereof shown in a changed relation.

Fig. 12 is a perspective detail view of a cam forming a part of the timer mechanism of the improved toaster and which will be more fully referred to later.

Fig. 15 is a view similar to Fig. 14 with certain of the parts shown in a changed relation.

Fig. 16 is a perspective view of a certain rock arm embodied in the improved toaster and which will be more fully referred to later.

Fig. 17 is a perspective view of a certain slide associated with the arm shown in Fig. 16 and which will be more fully referred to later.

Fig. 18 is a perspective view of a thermostatic control structure embodied in the improved toaster and which will be more fully referred to later.

Figure 1:
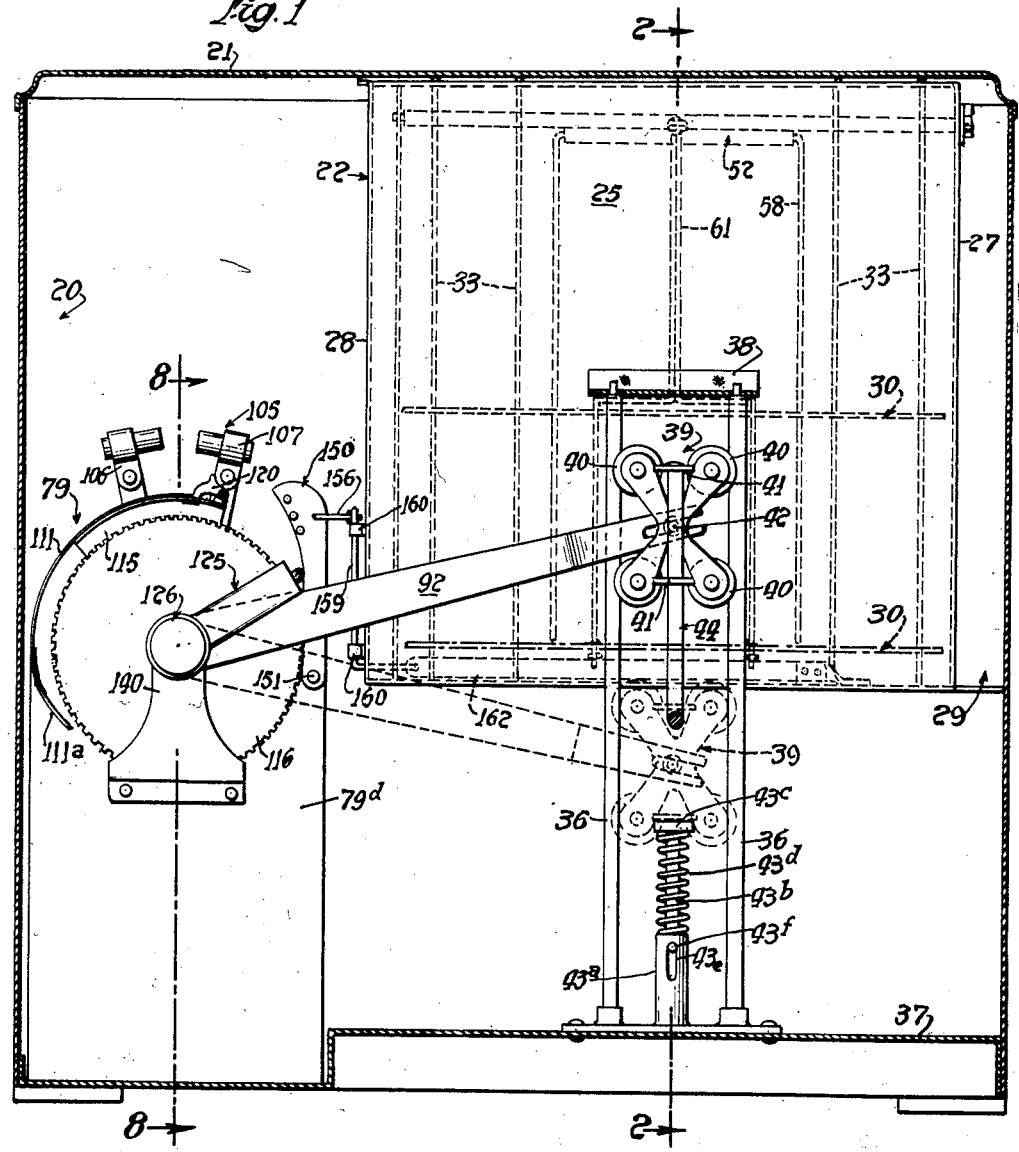
Fig. 1 is a longitudinal vertical sectional view through an automatic bread toaster embodying the preferred form of the invention, as taken on the line 1—1 of Fig. 2.

Referring now in detail to that embodiment of the invention illustrated in the drawings, 20 indicates as a whole the sheet metal casing of the toaster of generally rectangular shape and which includes a top wall or cover plate 21. The upper front end portion of the casing is occupied by a pair of laterally spaced toasting chambers 22—23 whereby two slices of bread may be toasted at the same time. Each chamber includes a horizontal bottom 24, inner and outer upright side walls 25 and 26 respectively, a front wall 27 and a rear wall 28. The walls 25, 26 and 28 are of a double or duplex construction for insulation purposes so as to conserve heat in said chambers. With the construction as before mentioned, it is apparent that a space 29 (see Fig. 1) is present between the toasting chambers and the outer casing and which space opens at its bottom and at its rear end into the interior of the casing 20.

Arranged centrally in each toasting chamber 22—23 and extending from substantially the front to the rear thereof is a horizontally disposed bread support 30. Said support is vertically movable in the associated chamber from the full line bread receiving position shown in Fig. 2 to the dot and dash line toasting position as shown in Fig. 1. The bread support is made in the form of a strip of sheet metal with laterally disposed arms 31, each having an opening 31a in the outer end thereof..

The top wall or cover plate 22 is made to provide longitudinal slots 32, one arranged centrally of each chamber 22—23 and above the bread support 30 therein. It is through these slots that slices of bread may be dropped or otherwise inserted to engage upon the bread support in the associated toasting chamber. Guard rods 33 are disposed at each side of each end of a slot 32 and extend downwardly therefrom to pass freely through the opening 31a in certain of the arms of the bread support for a relatively sliding movement. The top ends of the guard rods are made as lateral extensions 34 which are confined between marginal parts of the top wall of each chamber 22—23 and the cover 21 defining the mouth of each bread slot. Said extensions have downwardly directed ends 34a that extend through openings in said marginal parts of the top wall or cover as best appears in Fig. 2. The marginal parts of the cover defining the slots 32 terminate short of the planes of the wires 33 and thus present no edges for the slices of bread to catch against when the toasted bread is partially ejected from the associated toasting chamber at the end of a toasting operation.

In each toasting chamber and spaced laterally from the guard rods 33 thereof are electrical heating elements 35 of any conventional type and these elements appear best in Fig. 2. Said elements are so disposed in the associated toasting chamber 22—23 as to extend the full area of each slice of bread to be toasted, when the associated bread support is in its toasting position. Thus each slice of bread is evenly toasted on both sides.

Upright posts 36—36 are disposed in a plane midway between the inner side walls 25—25 of both chambers 22—23 and about midway between the front and rear walls of said chambers. The bottom ends of said posts are suitably anchored to a base 37 in the front bottom portion of the casing and the top ends of said posts are engaged in a plate 38 that is fixed at its opposite side margins to the inner side walls 25 of both toasting chambers.

A carriage 39 is disposed between said posts 36—36 and carries pairs of upper and lower grooved rollers 40 that ride against the opposed sides of said posts. The carriage includes top and bottom laterally extending ears 41 on each side and a center pin 42 having ends projecting beyond each side of the carriage. The purpose of said projecting ends of the pin, which appear in Fig. 2 will later appear.

Rising from the base 37 at a point between the posts 36—36 and centrally of and below the carriage 39 is a yielding bumper 43, adapted to cushion the downward movement of the carriage when the carriage is moved into a position corresponding to the toasting position of the bread supports 30. The bumper comprises an upstanding tubular boss 43a in which slides a plunger 43b that carries a head 43c at its top end. A spring 43d surrounds that part of the plunger between the head and boss. In opposite sides of the top end of the boss are longitudinal slots 43e in which the ends of a cross pin 43f, carried by the plunger engage. These pin ends and the slots, guide and limit the movement of the plunger 43b with respect to the boss 43a. When the carriage is moved downwardly into that position that corresponds to the toasting position of the bread supports 30—30, the central bottom portion of the carriage 39 engages the plunger head 43c. This compresses the spring 43d and cushions the downward movement of the carriage.

44—44 indicate U-shaped yokes whereby both bread supports 30 are operatively connected to the carriage 39 and which best appear in Fig. 2. Each yoke includes long and short upright legs 45 and 46 respectively and a bottom end connecting member 47 for said legs. The short legs 46 of said yokes are disposed at opposite sides of the carriage 39 and are suitably fixed in the top and bottom ears 41 therof. The long legs of said yokes extend up through suitable openings 24a in the bottom wall 24 of each chamber 22—23 and are fixed at their top ends centrally to an associated bread support 30. The bottom end connecting member 47 of each yoke is at all times disposed beneath the said bottom wall of the associated toasting chamber. It is apparent from the above that both bread supports 30 are operatively secured to the carriage 39 which provides a vertical guided movement for the bread supports from the bread receiving position thereof to the bread toasting position and vice versa.

In the upper end portion of each toasting chamber 22—23 is located a pair of horizontal rock shafts 50—50 that extend from the front to the rear of said chamber. The rear end of each shaft 50 is journalled in a part of the rear wall 28 of said chamber while the front end of each shaft 50 is journalled in the front wall 27 of said chamber and extends into the space 29 at the front end of the casing and which has been previously mentioned.

The major portion of each of said rock shafts is disposed in the upper sleeve 51 of a tubular-like sheath 52 (see Fig. 7) and the mid portion of said shaft is formed with an inwardly extending, lateral arm 53 that projects through an opening 54 in the side of the sleeve to terminate in an eye 55. The opening 54 is so formed that the shaft 50 is capable of a limited rocking movement in the sleeve 52 and in another instance is rocked by a turning movement of the sheath on said shaft.

The sheath 51 includes a lower and shorter sleeve 56 in which is engaged the horizontal portion 57 of a pair of arms 58 that normally depend downwardly and inwardly toward the associated bread support 30. These arms are so spaced apart longitudinally as to be disposed in the space between certain adjacent arms 31 of the bread support (see Fig. 3). Said arms are of such length that the planes of the lower end portions of said arms on one side of each chamber approach the planes of the like portions of the arms on the other side of the chamber as when viewed from one end of the associated bread chamber. Thus the lower end portions of said arms on both sides of the chamber coact to form a downwardly tapering space between the guard rods 33 in each toasting chamber. The angle of the taper of said space is such that with the plane of said support 30 is narrower than the width of a conventional slice of bread and which bread is substantially as thick as the width of the inlet slots from each chamber. Thus when a slice of bread is inserted into a toasting chamber, to approach the associated bread support which is in its bread receiving position, the bottom end thereof engages the spaced arms 58 in said chamber and swings them apart laterally before the bread engages upon said bread support.

60 indicates a pair of stop control rods located one on each side of each toasting chamber in the plane of the guard rods 33. Each stop control rod includes a duplex stem 61, the top end of which is formed as an outwardly extending lateral eye 62 that has a relatively loose rivet-like connection 63 with the eye 55 of the arm 53 of the rock shaft 50. Each rod 60 also includes front and rear extensions 64 that are disposed in a plane above the bread support and depending bars 65 that extend through and have sliding bearing in openings formed in the pair of middle arms 31 of the associated bread support. Each bar 65 has a shoulder 66 near its bottom end that is normally positioned a short distance above the plane of the bread support when the latter is in its bread toasting position. Thus in the movement of the bread support from its bread receiving to its bread toasting position, said support will engage said shoulders 66 from above and will exert a downward pull on the rods 65 which through the arms 53 will rock the shaft 50 in the opposite direction.

The pairs of shafts 50—50 are adapted to actuate the starting switch mechanism of the toaster in the space 29 of the casing and which mechanism is constructed as follows: Each shaft 50 has an arm 59 fixed to that end thereof within the space 29, the arms on said shafts 50 of each pair of such shafts extending toward each other. Each arm is bifurcated at its inner end to provide top and bottom fingers 67—68 with a recess 69 therebetween, the finger 67 carrying a contact 67a. 70 indicates a pair of fingers which are disposed in the plane of the arms 59 and which are pivotally connected together as at 71. The outer end of said fingers extend into the recess 69 between the fingers 67—68 of an associated arm 59, and the outer end of each finger carries a contact 72 for engagement with and disengagement by the contact 67a. The pivotal connection between the fingers 70—70 is a floating one and has a vertical movement both upwardly and downwardly between limit stops 73 of insulation carried by the casing.

In the vertical plane of the connection 71 and anchored at a point 74 above said connection to the wall 27 of an associated chamber 22—23 is a substantially inverted U-shape spring 75 of flat stock that includes downwardly extending arms 76, the bottom ends of each of which has a hooked connection with an associated finger 70 at a point between its ends.

The arms 59 each have associated therewith a light spring 77 that normally tends to swing said arms upwardly to engage associated stops 78. When the shafts 50 are rocked in one direction, the arms 59 swing downwardly to cause engagement of their contacts 67a with the contacts 72 and this will cause the fingers 70 to swing about the connection with the spring arms 75 so that the outer ends of the fingers swing tacts 67a and 72 being engaged. In this respect, it is pointed out that the movement of the rock shafts 50 is divided into two parts, viz: an initial part as when the bread dropped into the toaster engages the rods 58 and swings them laterally and a final part as when the bread support approaches its toasting position and wherein said support engages the shoulders 66 on the rods 65.

In the initial part of the rocking movement of said shaft 50, both arms 59 swing downwardly so that the contacts 67a engage the contacts 72 on the fingers 70 and swing said fingers into a plane coincident with the plane passing through the shafts 50 and the pivotal connection 71 for said fingers when said connection has left the lower stop 73. This is the "center" position for the fingers and at this time the contacts 67a and 72 are still engaged to complete the circuit controlled by them. In the final part of the movement of the arms 59, they swing the fingers 70, through or past said "center" position into "over center" position so that the contacts are disengaged and the controlled circuits are disconnected. These parts and the positions thereof, as above mentioned, appear in Figs. 4, 5 and 6.

At the rear bottom end of the casing is located a mechanism indicated as a whole at 79 and which mechanism controls the movement of the bread supports 30—30 and the timing of the toasting operation. This mechanism includes an upright casing that rests upon the bottom of the toaster casing. Said casing embodies side walls 79b and 79c and front and rear walls 79a and 79d and a rounded top wall 80. The bottom end of the casing has a lateral extension 81 on that side associated with the side wall 79a and in said extension is disposed an electromagnetic coil 82 and associated armature 83, the axis of which is arranged vertically. In said casing 79 above the coil 82 is located a small but suitable electric motor 84 that drives a reducing train of gears 85 and which in turn drives a cross shaft 86 having a pinion 87 fixed thereto just outside the wall 79d.

Figure 13:
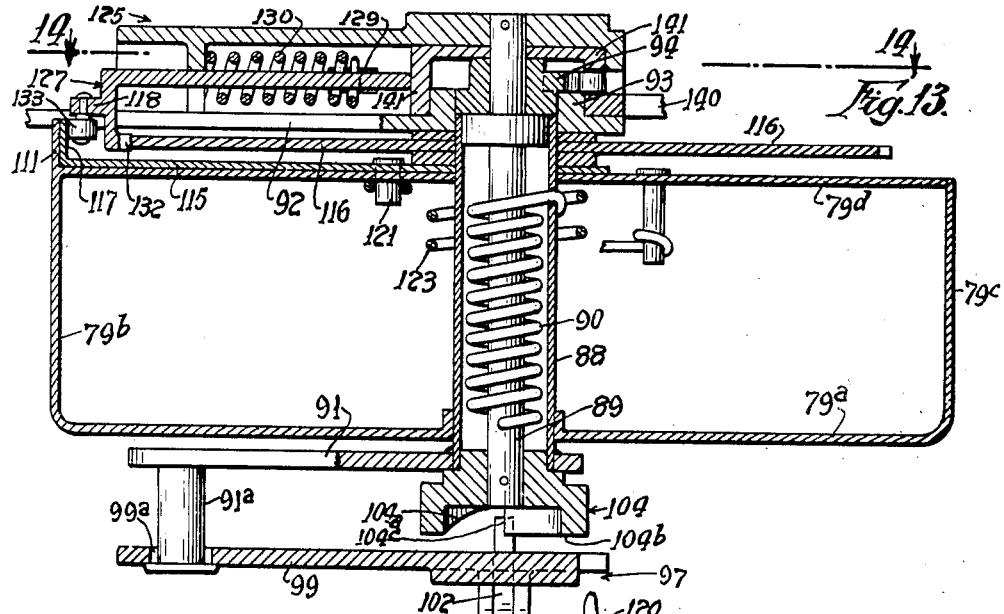
Fig. 13 is a horizontal detail sectional view, on an enlarged scale, through parts appearing in Fig. 11, the plane of the section being indicated by the line 13—13 on said Fig. 11.

In the upper portion of the casing is journalled a tubular shaft 88 and suitably journalled within the tubular shaft is a second and solid shaft 89. A torsion spring 90 is arranged between said shafts with one end fixed to the tubular shaft and with the other end fixed to the solid shaft as shown in Fig. 13. One end of an arm 91 is fixed to that end of the shaft 88 just outside the wall 79a and the other end of said arm carries an outwardly extending pin 91a, the purpose of which will later appear.

92 indicates the bread support actuating arm, the hub end 93 of which is fixed to that end of the tubular shaft 88 that projects outwardly through the casing wall 79d and on said hub is fixed a cam-like boss 94. The other end of said arm projects toward the front end of the toaster casing where it is bifurcated to operatively engage the ends of the cross pin 42 carried by the carriage 39 as before mentioned.

Thus when the tubular shaft 88 is rocked in one direction as will later appear, it is apparent that the arm 92 will swing downwardly to move the bread supports from the bread receiving position to the toasting position and in this movement will store up power in the spring 90.

A bar 95 is pivotally connected at its bottom end to the top end of the armature 83 and this bar extends upwardly therefrom to slide through the side wall 79a above said extension. A vertically movable but non-rotatable bell crank-like member 97 is fixed to the top end of said bar and a spring 98 surrounds that part of the bar between the bracket 96 and the bottom of the member 97. When the coil 82 is energized and attracts its armature 83, the bar 95 is pulled downwardly and this will compress the spring 98 to store up power therein. It is the power thus stored up, when appropriately released, that swings the arm 92 upwardly to return the bread carrier to its bread receiving position, after the completion of a toasting operation.

The bell crank-like member 97 includes a horizontal arm 99 and upright arm 100. The arm 99 has a short slot 99a at its free end (see Fig. 13) in which the pin 91a of the arm 91 before mentioned is operatively engaged. The free end of the upright arm 100 carries a pin 101 that extends inwardly toward the casing wall 79a and journalled on said pin is a pair of rollers 101a and 101b.

The member 97 has a vertical opening 97a therein and a pawl 102 is journalled at its bottom end therein and the top end of said pawl is formed with an inwardly extending tooth 102a as shown in Figs. 8 and 9. A spring 103 carried by the arm 100 so engages the top end of the pawl as to urge the same inwardly, the top end of the pawl and the top end of the slot 97a being so formed as to limit the inward movement of the top end of the pawl. This tooth of the pawl is adapted to coact with a member 104 fixed to that end of the shaft 89 that extends through the casing wall 79a. The member 104 which appears in perspective in Fig. 12, is formed with a gradually rising cam face 104a of about 180° in arcuate length and a "high" portion 104b of about the same arcuate length the two faces being connected at one end by a step off 104c. The "high" portion of this cam face is so disposed with respect to the end of the tooth 102a of the pawl that when the bar 95 is pulled downwardly, the tooth of the pawl will hook under the periphery of the high portion of the cam 104 and will lock or hold the bar 95 in its downward position as shown in Figs. 10 and 13. When said cam member is rotated as will later appear, as the "step off" 104c of said cam reaches said tooth, it releases said pawl so that in the further rotation of the member 104 the tooth is returned to its normal position in the member 97.

The rollers 101a and 101b on upright arm 100 of member 97 constitute the actuators for the main switch 105 of the toaster which controls the energization of not only the heating elements 35 but also the motor 84 both of which have been previously mentioned. The main switch 105 is composed of a pair of contact carrying arms 106 and 107 respectively, one located on each side of the axis of the shaft 101 carried by the arm 100. The arms 106 and 107 are pivoted individually at 108 on the side wall 79a of the casing 79. These arms are disposed laterally, one in the plane of each roller 101a and 101b and by which they are engaged and said arms each carry a contact 106a and 107a respectively at their upper end. A spring 109 is disposed about each pivot 108 and so engage the associated arm 106—107 and a stop pin 110 on the casing wall 79a as to swing the contact carrying ends of said arms outwardly against said stops 110 as seen in Fig. 9. This represents the normally open position of the When the member 97 moves downwardly under conditions previously mentioned, the rollers 101a and 101b roll downwardly of the respective arms 106—107 past the pivotal connections 108 for said arms, to engage portions of said arms below said pivots. This swings the arms 106 and 107 toward each other against the action of the springs 109 so that the contacts 106a—107a are engaged to complete the circuit controlled thereby as seen in Fig. 10. These contacts are held engaged so long as the tooth 102a of the pawl 102 is held in the downward position by the "high" part of the cam member 104. When said cam member releases the pawl as before mentioned, the spring 98 expands and moves the arm 100 and the rollers 101a and 101b upwardly past the pivots 108 so that the springs 109 function to swing the upper ends of the arms 106 and 107 outwardly to separate the contacts 106a and 107a and open the circuits controlled thereby.

Figure 14:
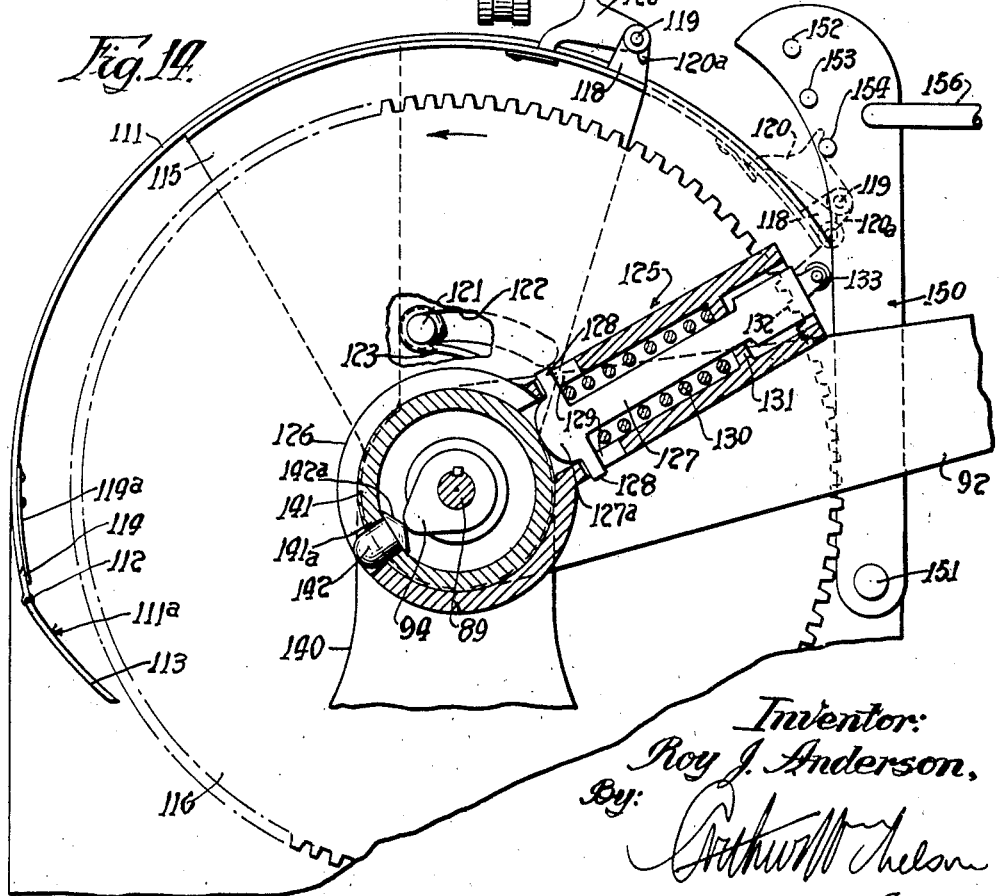
Fig. 14 is a vertical detail sectional view as taken on the line 14—14 of Fig. 13.

111 indicates a laterally extending flange that follows about a portion of the rounded top end part of the casing wall 80 as shown in Figs. 13 and 14. Said flange forms an arcuate track that starts at the top of said part of the wall and follows about and then downwardly of said wall so as to be approximately a trifle more than 90° in extent. Associated with the lower end of said track is a switch member 111a pivoted to said wall as at 112 to form a long arm 113 and a short arm 114. The short arm of said switch is engaged by a leaf spring 114a of slight tension and which is carried on the inside of said end of the flange 111. With this arrangement, after a certain roller 133, later to be described, moves in one direction, under said flange, said roller is caused to roll against the outer face of said flange, in its movement in the other direction.

115 indicates a shroud plate that is journalled on the tubular shaft 88 between the frame member 79d and a peripherally toothed timer wheel 116 also journalled on said shaft adjacent the arm 92. The shroud plate is of a segmental shape and is provided with an outwardly extending peripheral flange 117 that fits under the track flange 111 before mentioned and forms, under certain conditions, an adjustable front end extension of the track flange 111 as will later appear. At the front end of the extension flange 117 of the shroud, is a projection 118 in which is journalled a rock shaft 119 and fixed to one end of said shaft is a spring pressed hook-like latch 120 that normally engages the end of the flange 111 for a purpose to appear later. The latch is provided with a hook 120b. The nose of the latch is received in a slot 165 in flange 117 and seats against a leaf spring 166 secured beneath the slot. A tongue or dog 120a secured to the other end of rock shaft 119 is actuatable to depress the latch downwardly against opposition of the leaf spring under certain conditions as illustrated in dotted lines in Fig. 14.

The shroud is capable of a rocking movement on the shaft 88 and this movement is limited by means of a pin 121 that extends through an arcuate slot 122 in the side plate 79a. A torsion spring 123 shown in Fig. 13 surrounds a part of the shaft 88 near the side plate 79d and one end of said spring is operatively engaged with the pin 121 and the other end of said spring is fixed to the side plate. This spring normally tends to swing the shroud counterclockwise as appears in Figs. 14 and 15 to that position as limited by the and 15.

125 indicates a timer arm that is fixed on the end of the shaft 89 outwardly of the ejector arm 92 shown in Fig. 13. The inner end of said arm as shown in Fig. 16 is made as a circular housing 126, the arm itself being of a channel cross section. A plunger 127 best shown in Fig. 17 is arranged in the arm and its inner end is made as a cross head with its end extremity 127a normally disposed within the housing 126 as seen in Figs. 13 and 14. The head includes lateral lugs 128 that extend through longitudinal slots 129 in the sides of the arm 125. A spring 130 surrounds a part of said plunger between said lugs 128 and bosses 131 in said arm. The outer end of said plunger carries a laterally extending rack section 132 that is disposed in the plane of the timer wheel 116 and also carries a laterally extending roller 133 that is arranged in the plane of the track flange 111 and its extension flange 117 on the shroud 115. The spring 130 normally urges the plunger 127 inwardly so as to engage its rack section 132 with the teeth of the timer wheel 116. At one end of the swing of said arm 125, shown in Fig. 15, the roller 133 will pass the switch 111a so that in the return swing of said arm, the roller will roll up the switch arm 113 and ride the outer surface of the flange.

To disengage the rack section 132 of the plunger 127 in the arm 125 so that the plunger is disconnected from the timer wheel 116 and so that the arm may swing toward its normal position, the following mechanism is provided. 140 indicates a stationary bracket that is fixed to the side plate 79d below the shaft 89 and formed with an annular flange-like head 141, that fits in the head 126 of the timer arm 125 and surrounds hub 93 of ejector arm 92. One part of the annular flange-like head 141 is cut away to accommodate the movement of the ejector arm 92 and in another part of said flange is an opening 141a to accommodate a floating cam 142, see Fig. 14. The inner end of said cam is made as an enlarged head 142a disposed in the vertical plane of the cam 94 on the hub of the ejector arm. The other end of said cam 142 normally rides against the inner face of the flange-like head 126 of the timer arm 125 and when the timer arm is swung to its limit of movement in one direction, said cam 142 registers with the inner end of the plunger 127 as shown in Fig. 15 to move the plunger outwardly, thereby disengaging rack section 132 from the timer wheel 116 and throwing roller 133 outwardly beyond the end of switch arm 113.

150 indicates an arm that is pivoted at its bottom end at 151 to the casing 79 in substantially the plane of the casing wall 79d. The upper end of said arm carries a plurality of laterally spaced pins 152—153 and 154 respectively, located at different distances away from the pivot 151 and which pins project into the path of movement of the latch 120 on the shroud 115 when the shroud is returned to its foremost position indicated in the dotted line showing of Fig. 14 by the return movement of the timer arm 125.

One end of a link 156 is pivotally connected to the upper end of the arm 150 and the other end of said link has a loose fit connection 157 with the associated end of a horizontally swingable posed rock shaft 159 that is pivotally mounted in spaced bearings 160 fixed to the rear wall of one of the toasting chambers 22—23. A link 161 extends somewhat rearwardly and laterally from the bottom end of each shaft 159 to have a loose fit connection with a thermostatic bi-metal bar 162 positioned in the bottom end of associated toasting chamber.

It is pointed out that the only function of the switch mechanism including contacts 67a and 72 in the space 29 of the casing 20, which is closed by insertion of a bread slice and opened upon movement of the bread support to toasting position is to energize the electromagnet 82 and then deenergize the same, the magnet in turn when so energized functioning to close the main switch 105 and comprising the arms 106—107 and contacts thereof not only to charge and start the motor 84 but also to energize the electrical heating means or elements 35, the magnet in the meantime being deenergized. The deenergization of the magnet does not at this time open the switch arms 106—107 and deenergize the heating elements because the bell crank member is held "down" by the pawl 102 by reason of its engagement with the cam 104.

After a toasting operation, the bread support 30 remains in the bread receiving position, at which time the switch 105 is in its open position appearing in Fig. 1 and the arms 58 in each toasting chamber stand in the downwardly and inwardly angular position appearing in Fig. 2. Also at this time the shroud or sector-like plate 115 has swung into its normal position, toward the left as appears in dotted lines in Fig. 14 and the rack teeth 132 carried by the arm 125 are engaged with certain of the teeth of the timer wheel as shown in Fig. 14.

Assume that a slice of bread is dropped into either of the slots 32 leading into the associated toasting chamber. As said bread slices approach the arms 58—58, the arms are caused to swing apart and as said arms are connected to the sheaths 52—52, both sheaths rock outwardly. When the upper edges of the slots or openings 53 in said sheaths engage the upper sides of the arm 54 of the shafts 50, this rocks the shafts 50 a limited amount. At this time the bread slices are engaged on the associated bread supports 30.

As the contact arms 59 are fixed to the ends of the shafts 50 in the space 29, this rocks both arms 59 downwardly a limited distance only from the position shown in Fig. 4. In this movement of said arms the contacts 67a engage the contacts 72 of the fingers 70 and swing them into a position wherein they stand in a plane coincident with a plane passing through the axis of the shafts 50 and the axis of the pivotal connection 71 between the fingers 70 as appears in Fig. 5.

This closes a circuit through suitable conductors to energize the coil 82 of the electro-magnet in the extension of the housing 79. When said coil is so energized, it attracts its associated armature 83 to exert a downward pull on the bar 95 against the action of the spring 98 to compress the same and store up energy therein. As the bar 95 carries the bell crank lever 97, the same moves downwardly with the bar. This not only energizes the motor 84 to start the timing of the toasting operation, but it energizes the heating elements 35 in the toasting chambers 22—23 and it also causes the bread support to In the downward movement of the bell crank 97 with the bar 95 from the position shown in Figs. 1 and 9 to that of Fig. 11, the rollers 101a and 101b move downwardly past the pivots 108 for the contact arms 106—107. As they approach the bottom ends of said arms, they spread them apart causing the top ends thereof to swing toward and into engagement with each other to engage contacts 106a and 107a of switch 105 and thus close the circuit for the heating elements in the toasting chambers and energize the motor 84.

Also in the downward movement of the bell crank 97 with the bar 95, the arm 99 of said bell crank through its pin and slot connection 91a—99a will swing said arm 91 downwardly. As the arm 91 is fixed to one end of the tubular shaft 88 and as one end of the bread support actuating arm 92 is fixed to the other end of said shaft as appears in Fig. 13, said arm 92 is likewise swung downwardly. As the other end of said arm 92 is operatively connected to both bread supports through the carriage 39 and the two U-shaped members 44, it is apparent that the bread supports are moved downwardly in the toasting position in their respective toasting chambers. This downward movement of the carriage and the bread supports is cushioned by reason of the engagement of said carriage with the cushioning means 43.

It is further pointed out at this time, that as the bar 95 is drawn downwardly under the pull of the coil 82 and armature 83, the pawl 102 wipes over or across the face of the cam 104 so that its tooth 102a snaps under the high portion of the face of said cam and which is now at the bottom side of the cam as will be understood from a comparison of Figs. 8, 9 with Figs. 10, 11. This locks the parts previously mentioned in a position corresponding to the toasting position of the bread supports.

As the bread supports approach toasting position at about the time that the tooth of the pawl 102 snaps under the high portion of the cam and holds said parts in this position, the coil 82 is next deenergized as follows:

As the bread supports approach toasting position, the bread supports engage the shoulders 66 on the bars 65 and exert a downward pull thereon. By reason of the loose connection 63 each set of bars 60 has with the associated shafts 50, the final part of the rocking movement is imparted to both shafts 50—50, in the same direction as before.

This will cause the fingers 67 of the arms 59 to throw the contact fingers 70—70 "over center" the spring arms 76 yielding to permit the pivotal connection 71 to move upwardly into the dotted line position against the upper stop 73 to limit the same. This throws the switch from its closed full line position into the dotted line open position shown in Fig. 5 wherein the circuit for the magnet 82 is broken and which is now deenergized. While the arms 59 are normally urged in the other direction by the springs 77 said springs are ineffective at this time because the bread supports which actuate the shafts 50 are both now locked in their toasting position so that arms 59 are retained in the position shown in Fig. 5.

Thus at this time the bread supports have been lowered into and are now locked in toasting position energized so as to drive the timing wheel 116 through the gear reduction train 85 as seen in Fig. 8. Also, when the arm 92 is locked in its down position, the cam 94 on its hub has turned from its full line position of Fig. 14 to the dotted line position thereof in Fig. 15 to disengage from the floating member 142 in the recess 141a of the bracket 140 and releases it from the locked projected position it normally occupies when the arm 92 is in a position corresponding to the bread receiving position of the supports 30 and in which position said member 142 projects beyond the periphery of the hub 141 on said bracket as in Fig. 14.

As the wheel 116 is now being driven from the motor 84 through the gear train 85 to the pinion 87 and as the rack teeth 132 carried by the plunger 127 of timer arm 125 are engaged with certain teeth of said wheel, said arm 125 is caused to turn with the wheel and this is counterclockwise as viewed in Figs. 14 and 15. The arm 125 being fixed to the shaft 89 will cause the cam 104 to turn with the shaft. As one end of the spring 90 is fixed to the shaft 89 and as the other end of said spring is fixed to the tubular shaft 88 which is now stationary, this functions to wind up said spring 90 to store power therein for the return movement of the arm 125 as will later appear.

In this forward or counterclockwise movement of the arm 125, its roller 133 rides under the flange 117 of the member 115 and also under the flange 111 on the casing side wall from the full line position of Fig. 14 to that of Fig. 15.

At about this time when the roller 133 reaches and passes under the free end of the switch arm 113 at the far end of flange 111, the cam 104 which through shaft 89 is turned with timer arm 125 will have released the latch 102 from its engagement therewith shown in Figs. 10 and 11 so that the spring 98 on bar 95 expands under its stored up energy to move the bell crank 97 upwardly to its position shown in Figs. 8 and 9. Thus through the arm 99, pin 91a, arm 91 and tubular shaft 88 will swing the arm 92 upwardly from its dotted line position to its full line position of Fig. 15 to return the bread supports to their bread receiving position. As the arm 92 swings into this last mentioned position, its cam 94 will turn counterclockwise as viewed in Fig. 15 to engage and move the member 142 outwardly. This action is timed to occur just as the plunger 127 which is turned with its arm 125 by the timer wheel 116 is brought to the position thereof shown in Fig. 15 to line up therewith so that said plunger is projected outwardly to release its rack 132 from the teeth of the timing wheel and to so position the roller 133 of said plunger as to cause the same, in the return movement of the timer arm 125, to travel upwardly upon the outer surface of the switch 113, which has snapped back to its normal position, and then onto the outside of the track 111. As the arm 125 is now disconnected from the timer wheel by engagement of roller 133 with track 111, the tension power stored up in the spring 90 tends to swing the arm 125 back toward its starting position and to swing the cam 104 back clockwise along the outside of track 111 to its starting position. In the return movement of the arm 125, as it reaches the upper end of track 111, it will engage the tongue 120a of pivoted latch member 120 on the shroud 115 and cause the movement of the member 115 energizes the spring 123, one end of which is fixed to the casing wall and the other end of which is fixed to the pin 121 on said member 115 as before mentioned.

In return movement of the bell crank 97, as before described, the rollers 101a—101b (see Fig. 10) move upwardly past the pivotal connections of the switch arms 106—107 so that the springs 109 function to separate the upper ends of the arms 106—107 and contacts 106a and 107a carried thereby. This opens the circuit for the heating elements 35 and for the motor 84 both of which are then deenergized.

As the bread supports 30—30 under the expansive force of the spring 98 mechanically connected to the arm 92, start their upward movement from toasting position towards bread-receiving position upon completion of a toasting operation they will release parts 66—66 of the members 60, and in the final part of their movement into bread-receiving position will engage parts 64—64 and move members 60 upwardly. Through the loose connection 63 of said members with arms 54 of shafts 50, this will rock shafts 50 to swing contact arms 59 upwardly to their horizontal intermediate position shown in Fig. 5, and such arms are held in this position by reason of engagement of arms 58 with the toasted bread slice. At this time spring fingers 70 are still in their dotted line lower position shown in Fig. 5 so that contacts 67a and 72 are not engaged. When the toasted bread slice is removed after the bread support reaches its upper bread receiving position arms 58 are freed with the result that springs 77 act on arms 59 to swing the same to their uppermost position against stops 78 as shown in Fig. 4. During this movement of arms 59 the lower fingers 68 of arms 59 engage spring contact fingers 70 to return the same with a snap action through center position to the normal position thereof shown in Fig. 4 while the upper fingers 67 of the arms are moved up out of the way of fingers 70 to their upper position. The parts of the switch are so formed and correlated that during the resetting of the switch incident to the return of the bread support to bread receiving position and the removal of the toasted bread slice no engagement is produced between contacts 67a and 72. Magnet 82 will therefore not be reenergized to cause the bread support to move downwardly again until a new bread slice is inserted to engage arms 58 and cause the latter to swing arms 59 from the position shown in Fig. 4 to that shown in Fig. 5.

It is apparent that during the toasting operation the free end of the bi-metal bars 162 in response to temperature increases in the toasting chambers move laterally and through the links 161 will rock the shafts 159 and swing the arms 158 toward the member 150 as will be understood from Figs. 1 and 18. As the arm 158 is connected to the member 150 through link 156 as before described, this will swing the top end of the arm 159 forwardly toward shroud 115 as the toasting chamber temperature changes so as to bring one or the other of the pins 152—153—154 thereon, into the path of the latch 120 on the member 115. At one temperature in the toasting chambers the pin 154 is disposed in said path, at a second and higher temperature the pin 153 is disposed in said path and at the Thus after a toasting operation, as the timer arm 125 returns toward its normal position and is carrying the member 115 therewith, through the engagement with the part 120a, a hook 120b on the latch 120 will engage the pin 152—153—154 disposed in its path. As the hook is mounted on the same rock shaft 119 as the tongue member 120a, when the said hook so engages said one of said pins, this causes the latch 120 and the member 120a to swing counterclockwise, depressing the nose of the latch through slot 165 against opposition of spring 166, so that the roller 133 on the arm 125 can pass under and beyond said member 120a. When this occurs the spring 130 operating against the plunger 127 will draw said plunger inwardly of the arm 125 to reengage the rack 132 with the teeth of the timerwheel 116 which at this time is not in motion. So soon as the roller 133 has passed beyond the member 120a, this disconnects the member 115 from the arm 125. The spring 123 then functions to return the member 115 counterclockwise to its normal position wherein the trigger 120 engages the associated end of the track 117.

If a second toasting operation is immediately initiated by dropping slices of bread into the slots or openings 32, the operation is repeated as before. However, the time required for such a second toasting operation will not be so long as that required for the first one, starting with a cold apparatus, because the timing arm 125 will not have to travel through so long an arc as in the first operation. Thus the length of the arc through which the timer arm travels with the timing wheel is controlled by the temperature in the toasting chambers at the end of each preceding toasting operation. It will be apparent in this connection that the timing period for a toasting operation is measured by the arcuate distance between the right end of shroud 115 at which roller 133 is released from the shroud and causes rack 132 to engage the timer wheel to the left lower end of track 111 at which floating cam 142 acts on plunger 127 to release rack 132 from engagement with the timer wheel. This distance will vary with the adjusted position of shroud 115 in accordance with the setting of arm 150 by the thermostatic member 162 in the toasting space and which of stops 152, 153 and 154 on member 150 determine the right end limit position of shroud 115 through engagement with hook 120b of the latch carried by the shroud.

With the structure described, all that is necessary to initiate a toasting operation is to drop sliced bread into the bread slots or openings and after the toasting operation has thus been initiated, the rest of the operation is entirely automatic because the bread supports are moved into toasting position and the heating elements are energized. When the toasting operation is completed, the bread supports move automatically back to bread receiving position so that the finished toast is presented for removal and the heating elements are deenergized.

Thus it is apparent that a toasting apparatus has been provided wherein all the operator has to do is to drop in the sliced bread and after said bread has been toasted, to remove the same therefrom.

While in describing the invention I have referred in detail to the form, arrangement and construction of the parts involved, the same is cept as may be specifically set forth in the appended claims.

I claim as my invention:

1. An automatic bread toaster embodying therein means providing a toasting chamber with bread receiving slot at the top thereof, bread supporting means in said chamber in line with said slot and movable vertically from a bread receiving position to a bread toasting position therein, means for moving said bread supporting means from its receiving position to its toasting position, and means having parts thereof spaced laterally and arranged above said bread supporting means, when the latter is in its bread receiving position, at both sides of said slot and adapted to be engaged by a slice of bread when inserted into said slot to cause said moving means to move the bread supporting means into its toasting position.

2. In an automatic toaster, a bread support movable from a bread receiving position to a bread toasting position, electrical means for moving said support from said receiving position to said toasting position, means for moving said support from said toasting position back to said bread receiving position, a switch for controlling said electrical means and capable of being actuated from an "off" position through an "on" position to energize said electrical means and then to a second "off" position and then being capable of being reset to the first "off" position, and means adapted for engagement by a piece of bread as it is placed in operative position with respect to the supporting means, when in bread receiving position, for moving said switch from the first mentioned "off" position to the second mentioned "off" position, and means actuated by said bread receiving means as it approaches said receiving position in its return to that position for resetting the switch into its first mentioned "off" position.

3. In an automatic toaster, means providing a toasting chamber having a bread slot at the top, a bread support in said chamber in line with said slot and movable from a bread receiving position to a bread toasting position in said chamber, electrically actuated means for moving said support from said first mentioned position to the second mentioned position, a stationary switch for controlling said electrically actuated means, a pivotally mounted member adapted to be engaged by a piece of bread entered into said slot for closing said switch when said support is in its receiving position to energize said electrically actuated means and means whereby said pivotally mounted member is rendered inoperative to close said switch upon movement of the bread support to its toasting position.

4. In an automatic toaster the combination with heating means, a reciprocating bread slice support movable into toasting and non-toasting position relative to said heating means, electromagnetic motor means for moving the bread slice support from non-toasting to toasting position, a control circuit for energizing the electromagnetic motor means, of weight-responsive means for initiating a toasting operation engageable by a bread slice during its introduction to the bread slice support with the latter in non-toasting position to close the electromagnetic motor means circuit, and means operative when the carrier is in toasting position independently of the presence of a bread slice on the support for opening the said circuit until the said bread slice has been removed from the said bread slice support.

5. An automatic bread toaster comprising a casing having a toaster chamber, a bread support in said chamber movable into bread-receiving and bread-toasting position in said toasting chamber, electrically-operated means for moving the said bread support from bread-receiving into bread-toasting position, a single stationarily mounted control means for the said electrically operated means, the said control means positioned within the said toaster, and the said control means actuated by a slice of bread as it is moved into said chamber for engagement on said bread support when the support is in bread-receiving position thereby causing the energizing of the said electrically-operated means, and automatic means whereby the electrically operated means may be deenergized independently of the said bread slice on the said bread support when the latter is in toasting position and means operating automatically at the end of a toasting operation for returning the said bread support to its bread-receiving position.

6. An automatic bread toaster embodying therein means providing a toasting chamber with a bread-receiving slot at the top thereof, bread-supporting means in said chamber in line with said slot and movable vertically from a bread-receiving position to a bread-toasting position therein, electrically operated motor means for moving said bread supporting means from its receiving position to its toasting position, and means for initiating a toasting operation having a part thereof arranged above the bread supporting means, when in its bread-receiving position, said part being adapted to be engaged by a slice of bread when inserted into said slot to energize said motor means to move the bread supporting means into its toasting position and the said initiating means automatically rendered inoperative to energize the motor means for the remainder of the cycle of operation of the said toaster upon movement of the bread supporting means to its toasting position.

7. An automatic electric toaster comprising a toaster structure providing a toasting chamber, a bread slice support in said chamber, power actuated means for moving said bread slice support from bread-receiving position to bread toasting position and means for releasably locking the said bread slice support in toasting position, means for releasing the said locking means at the end of a toasting operation, means effective when said locking means has been released to return the said bread slice support to its receiving position, a single switching means actuated by a slice of bread as it approaches the said bread slice support, when the said bread slice support is in its receiving position, to cause energization of the said power actuated means so as to cause movement of the bread slice support into the said toasting position, and means operable by the said bread slice support for deenergizing the said power actuated means during the remainder of the cycle of operation of the said toaster upon movement of the said bread slice support to the said toasting position.

8. In an automatic electric toaster of the class including a toaster structure providing a toasting chamber having a bread slot at its top, a bread support in said chamber reciprocably movable from bread-receiving to bread-toasting posiposition, and a switch for controlling said electrically actuated means; the improvement comprising switch controlling arms pivotally affixed to the said toaster structure above the said bread support and the said switch-controlling arms having parts positioned within the said bread slot above the bread support when in its bread-receiving position, the said parts depending downwardly toward the said bread support and the said depending parts of the said switch-controlling arms adapted to be slidably engaged by a slice of bread entered into the said slot in such a manner as to actuate the said switch so as to energize the said electrically actuated means to move the bread support to toasting position.

9. In an automatic electric toaster of the class including a toaster structure providing a toasting chamber having a bread slot at its top, a bread support in said chamber reciprocally movable from bread-receiving to bread-toasting position and return, electrically actuated means for moving said support from receiving into toasting position, and a switch for controlling said electrically actuated means; the improvement comprising first switch-controlling arms pivotally attached to the said toaster structure above the said bread support and the said first switch-controlling arms having parts positioned within the said bread slot, and the said parts of the said first switch-controlling arms adapted to be engaged by a slice of bread entered into the said slot in such a manner as to actuate the said switch so as to energize the said electrically actuated means to move the bread support to toasting position, second switch-controlling arms, the said second switch-controlling arms including projecting portions whereby on movement of the said bread support to bread-toasting position the said bread support is adapted to actuate the said projecting portions in such a manner as to actuate the said switch so as to deenergize the electrically actuated means.

10. In an automatic bread toaster of the class including a casing having a toasting chamber, bread-supporting means in said chamber movable from a bread-receiving position to a bread-toasting position in said toasting chamber, an electrically operated means adapted to move the said bread-supporting means from the said bread-receiving position to the bread-toasting position, and control means for closing the circuit of the said electrically operated means so as to energize the said electrically operated means to move the said bread-supporting means from the bread-receiving position to the bread-toasting position; the improvement comprising means opening the said circuit upon movement of the bread-supporting means to its toasting position, and means whereby the said control means is automatically rendered inoperative to close the circuit of the said electrically operated means un- 11. An automatic electric toaster comprising a toaster structure providing a toasting chamber, toast heating elements in said chamber, a bread support movable in said toasting chamber into bread-receiving and bread-toasting positions relatively to the toast heating elements and biased into toast receiving position, an electric timer motor, a switch for controlling the energization of said toast heating elements and said timer motor, an electromagnet for causing movement of said bread support into toasting position and closing of said switch, a rotary latch for holding said bread support in toasting position, a single switching means fixedly supported by said toaster structure and actuable into closed position by a slice of bread as it is moved into proper operative position on said support when the latter is in receiving position, to energize said electromagnet, a timer arm operatively connected with said rotary latch and rotatable by said timer motor through a given angle to cause release of said bread support from said latch and termination of a toasting operation.

12. In an automatic toaster the combination with heating means, a bread slice support adapted to support a slice of bread in toasting position relative to said heating means, and means to energize said heating means, of means to start energization of said heating means, means engageable with and actuatable by a slice of bread during its introduction towards rest position on the support to set such starting means in operation, means operated upon complete operation of said starting means to render said setting means inoperative on said starting means, and means operable upon removal of a slice from the toaster to restore said setting means to operative condition.

13. In an automatic toaster the combination with heating means, a bread slice support movable to support a slice of bread in non-toasting position and in toasting position relative to said heating means, means to energize said heating means, and means for terminating a toasting operation operative to de-energize the heating means and for restoring the support to non-toasting position, of means to move the support to toasting position and to start energization of said heating means, means engageable with and actuatable by a slice of bread during its introduction towards rest position on the support when the support is in non-toasting position to set such starting means in operation, means operated upon complete operation of said support moving and starting means to render said setting means inoperative on said support moving and starting means, and means operable upon removal of a slice from the toaster, after said terminating and support restoring means have operated, to restore said setting means to operative condition.

ROY J. ANDERSON.